Figure 1:
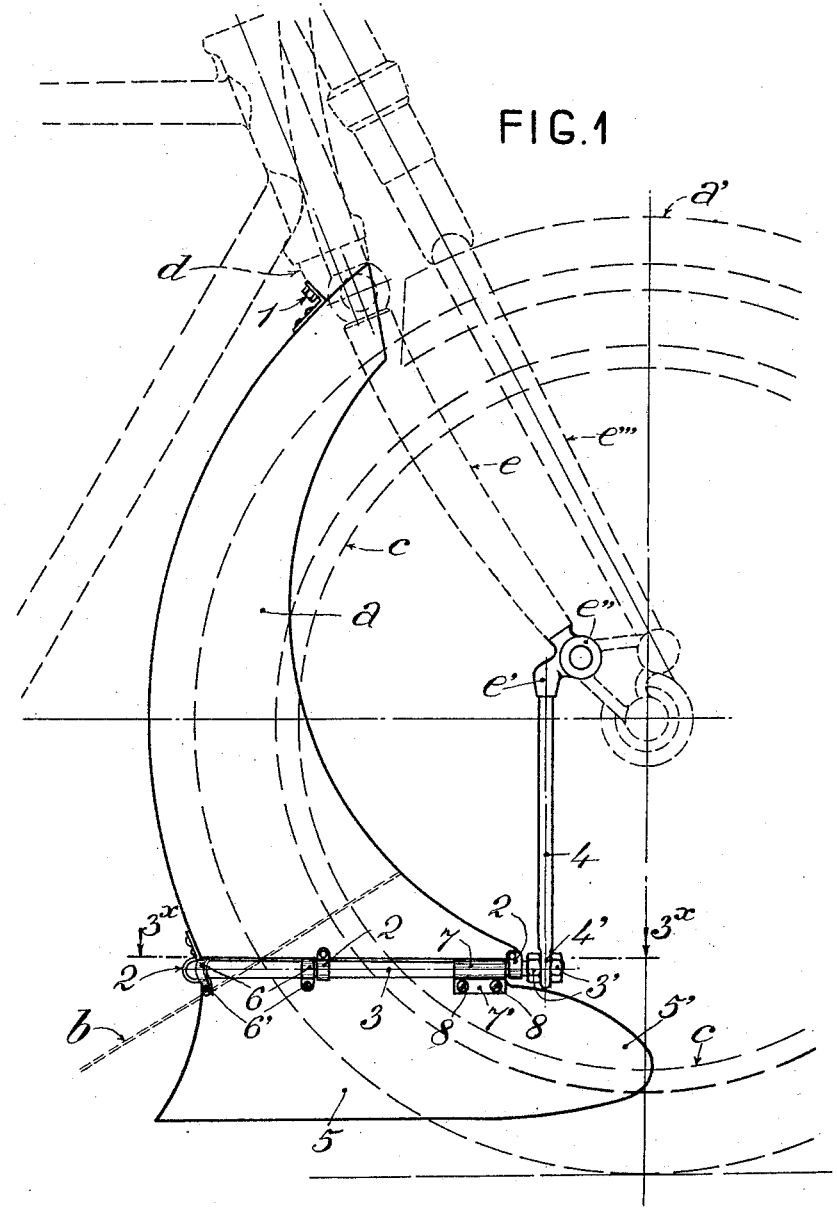

E. M. BORGO.
MUD GUARD WITH LOWER ELASTIC APRON.
APPLICATION FILED FEB. 25, 1920.

1,408,719.

Patented Mar. 7, 1922.
2 SHEETS—SHEET 1.

Inventor
Edmondo Michele Borgo.
By [signature] atty.

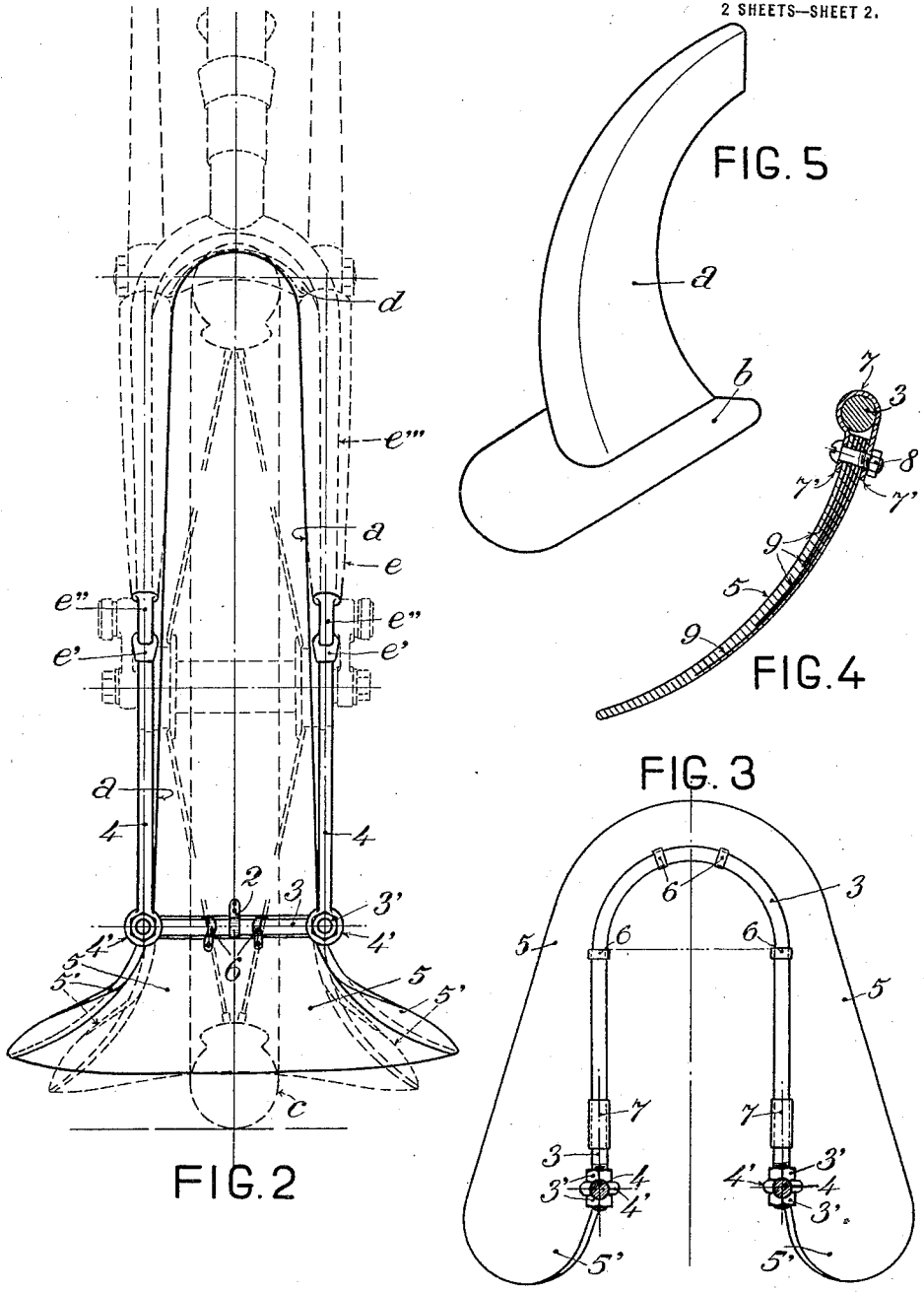

UNITED STATES PATENT OFFICE.

EDMONDO MICHELE BORGO, OF TURIN, ITALY.

MUD GUARD WITH LOWER ELASTIC APRON.

1,408,719.      Specification of Letters Patent.      Patented Mar. 7, 1922.

Application filed February 25, 1920. Serial No. 361,210.

*To all whom it may concern:*

Be it known that I, EDMONDO MICHELE BORGO, a subject of the King of Italy, residing at Turin, Italy, have invented certain new and useful Improvements in Mud Guards with Lower Elastic Aprons; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

The present invention relates to a mud-guard with lower elastic apron, especially applicable to the front wheel of motorcycles, or other vehicles in general and is intended to protect the machine from the mud splashed laterally or tangentially backwards, however close to the ground it may be.

A constructional form of the object of the invention, in its application to the front wheel of a motorcycle, is represented, by way of example, in the accompanying drawing, in which:—Figs. 1 and 2 show the mud-guard with apron as a whole in a side and front elevation respectively;—Fig. 3 is a horizontal section on the line —3×.3×— of Fig. 1;—Fig. 4 is a cross section of the apron body;—Fig. 5 shows in perspective the usual type of mud-guard.

The usual mud-guards for front wheels, especially those used for motorcycles and the like, consists (see Fig. 5) of the mud-guard of sheet-iron —a—, covering the wheel towards the rear, increasing in width as it approaches the ground, and ending in a flat screen —b— of sheet iron, placed obliquely. This screen —b— intended to protect from the mud splashed up close to the ground, does not answer its purpose, especially for the mud which is splashed laterally, while that directed tangentially towards the rear very often strikes the machine, as the screen —b—, being rigid, cannot be placed close enough to the ground on account of obstacles in the road.

Now the elastic apron, according to the present invention, obviates the above-mentioned difficulties and effectually protects the machine from the mud, however close to the ground, dashed up either laterally or tangentially towards the rear.

According to the invention, the mud-guard as a whole (see Figs. 1 and 2) consists of an ordinary mud-guard —a— of sheet iron, secured above by the bolt 1, for instance, to the bridge —d— of the rigid fork —e—. The portion —a—, together with —a'— connected with the spring counter-fork —e'''—, covers the wheel —c— above and at the sides. The mud-guard —a— preferably increases in width as it approaches the ground, and ends at a suitable distance from the same so as to obviate all danger of injury from obstacles in the road. This mud-guard is supported below by a plurality of clips 2 of sheet iron, to a round wire 3 bent in the shape of a stirrup placed horizontally all around the lower edge of the mud-guard —a—. The stirrup 3 is in its turn secured by the nuts 3' to the lower eye 4' of the two uprights 4, which are secured, for instance, by screwing to a projection —e'— of the lower end in the form of a fixing socket —e''— of the rigid fork —e—.

According to the invention, below the mud-guard —a— is placed the elastic apron 5, secured above to the stirrup 3, which has practically the form of a U and placed around the wheel at the rear and sides in such a way that its front wings 5' reach to the zone of contact between the wheel and the ground. This apron, which is slightly bell-shaped, reaches quite close to the ground.

The attachment of the apron 5 to the stirrup 3 may be effected by any means that are of a nature to permit of the easy adjustment of the inclination and consequently of the height above the ground of the front wings 5'. For instance, at the middle part of the apron this attachment may be effected by a number of clips 6 of sheet iron bent about the round wire of the stirrup 3, on which they can pivot, and fastened to the body of the apron by a small bolt or rivet 6'. Moreover the attachment of each front end of the apron is effected, for instance, by an open sleeve 7 of sheet iron, on the wire yoke 3, the lateral flanges 7' of which, enclosing from opposite sides the upper edge of the apron (see Fig. 4), are secured to the latter by the small bolts 8. By tightening the latter the sleeve 7 is secured by friction to the round wire 3 of the stirrup and this renders the whole of the apron immovable. By this arrangement the inclination or flare of the front wings 5' and consequently that of the side walls of the apron may be easily changed as shown by the full and dotted lines in Fig. 2.

The apron is made of a sheet of some material which is exceedingly elastic and soft, leather, for instance, or oil cloth, rubber, or the like, or else of a combination of these materials. The softness and elasticity of the portion of the apron which is nearest the ground is an indispensable condition, while the upper portion may be less elastic and soft so that in the zone of attachment to the stirrup 3, the apron may be almost rigid. This condition may be fulfilled by diminishing the thickness of the sheet of which the apron is composed from the upper edge to the lower, or by employing suitable means intended to render the apron gradually more rigid as it approaches the zone of attachment. If the apron is of vulcanized rubber, the condition of elasticity is fulfilled, as shown in the detail in Fig. 4, by giving, to the sheet which forms the apron a diminishing thickness from the upper edge to the lower and by inserting in the body of the sheet a number of canvas linings 9 all of which start from the upper edge of the apron and extend in gradually diminishing lengths within the body of the apron.

The apron described above, owing to its exceedingly elastic character and its shape, may be placed quite close to the ground without danger of injury from obstacles such as pebbles and the like, as these obstacles are pushed aside by the wings 5′ or by the sides of the apron, or else the lower edge of the latter, which is exceedingly elastic, bends and passes over the obstacles. It follows that the apron arranged and shaped as described above, protects the machine effectually from the mud splashed backwards whether laterally or tangentially and however close to the ground, and this in a much more effectual manner than that attained by the screen —b— of the ordinary mudguards, which screen, in the case of Fig. 1 would occupy about the position shown by the dotted lines. The efficiency of the apron 5 is the more pronounced, the more its sides and wings 5′ are lowered, as shown by dotted lines in Fig. 2. It is therefore advisable to adjust it in a suitable position corresponding to the conditions of the road. This adjustment is effected rapidly and easily, because of the special form of rotating attachment device on the front edges of the apron as described above.

It is evident that the object of the invention described above, with particular reference to its application to the front wheel of a motorcycle, may be applied with advantage to any other vehicle.

Claim:

1. A mud-guard comprising a substantially rigid portion conforming to the wheel periphery; in combination with a U-shaped wire connected to the bottom of said portion and a flaring, flexible apron secured to said wire and varying in flexibility toward its lower edge, and means to alter the degree of flare of such extension.

2. A mud-guard comprising a substantially rigid portion following the wheel periphery; in combination with a U-shaped wire secured to the lower end thereof, rods for connecting the ends of said wire to a frame element for the wheel, a flexible, flaring apron secured to said wire whose flexibility varies toward its lower edge, and means for varying the flare of the ends of the apron.

3. A mud-guard comprising a substantially rigid portion following the wheel periphery; in combination with a U-shaped wire at the lower end of said portion, a flaring, flexible apron varying in flexibility toward its edge and extending beyond the ends of said wire, and means to secure said apron to said wire, said means including sleeve clamps to vary the flare of said extending ends.

In testimony that I claim the foregoing as my invention, I have signed my name.

EDMONDO MICHELE BORGO.